United States Patent
Grandmougin et al.

(10) Patent No.: US 12,050,922 B1
(45) Date of Patent: Jul. 30, 2024

(54) BUILDING AND DEPLOYING AN EDGE DATA PIPELINE APPLICATION

(71) Applicant: Amazon Technologies, Inc., Seattle, WA (US)

(72) Inventors: Thibaut Pierre Grandmougin, London (GB); Bart Schouwenaars-Harms, Ythanwells (GB)

(73) Assignee: Amazon Technologies, Inc., Seattle, WA (US)

( * ) Notice: Subject to any disclaimer, the term of this patent is extended or adjusted under 35 U.S.C. 154(b) by 118 days.

(21) Appl. No.: 17/937,401

(22) Filed: Sep. 30, 2022

(51) Int. Cl.
| | |
|---|---|
| G06F 9/445 | (2018.01) |
| G06F 8/60 | (2018.01) |
| G06F 8/61 | (2018.01) |
| G06F 9/4401 | (2018.01) |
| G06F 9/448 | (2018.01) |

(52) U.S. Cl.
CPC ............ *G06F 9/44505* (2013.01); *G06F 8/60* (2013.01); *G06F 8/61* (2013.01); *G06F 9/4416* (2013.01); *G06F 9/4494* (2018.02)

(58) Field of Classification Search
None
See application file for complete search history.

(56) References Cited

U.S. PATENT DOCUMENTS

| | | | |
|---|---|---|---|
| 10,867,398 B2 | 12/2020 | Leduc | |
| 11,379,541 B2 | 7/2022 | Ricci | |
| 2020/0344299 A1* | 10/2020 | Sohail | G06F 9/5016 |
| 2022/0147009 A1* | 5/2022 | Cooley | G06F 9/54 |
| 2023/0028638 A1* | 1/2023 | Seawall | G06F 8/61 |
| 2023/0359583 A1* | 11/2023 | Bell | G06F 9/4494 |

OTHER PUBLICATIONS

WO 2018092226, English text (Year: 2018).*
CA 3176677, English text (Year: 2021).*
Ali et al. ("RES: Real-Time Video Stream Analytics Using Edge Enhanced Clouds" IEEE 2020 (Year: 2020).*

* cited by examiner

*Primary Examiner* — Insun Kang
(74) *Attorney, Agent, or Firm* — Robert C. Kowert; Kowert, Hood, Munyon, Rankin & Goetzel, P.C.

(57) ABSTRACT

An edge data pipeline service may build and deploy an edge data pipeline application to an edge device, based on specification provided by a user. The service may receive, from the client, indications for any number of data sources (e.g., cameras, sensors), data sinks (e.g., video files, databases), and application modules (e.g., motiondetect, anomalydetect) to be used by an edge data pipeline application at an edge device. The client may indicate a mapping that maps data sources to data sinks and one or more criteria that, when satisfied, cause an application module to send data from one or more data sources to one or more data sinks according to the mapping. The service builds a package and deploys the package to the edge device, which implements the data pipeline application to route data from sources to sinks.

20 Claims, 8 Drawing Sheets

```
"sources": [
  {
    "name": "rgb-camera",
    "module": "camera",
    "settings": {},
    "rate": 10
  },{
    "name": "thermal-camera",
    "module": "camera",
    "settings": {},
    "rate": 10
  }
]
```
502

```
"sinks": [
  {
    "name": "rgb-writer",
    "module": "videowriter",
    "settings": {}
  },{
    "name": "db-writer",
    "module": "databasewriter",
    "settings": {}
  }
]
```
504

```
"applications": [
  {
    "name": "motion-detection",
    "module": "motiondetect",
    "trigger": "rgb-camera",
    "mapping": {
      "rgb-camera": ["rgb-writer"],
      "motion-detection": ["db-writer"]
    },
    "settings": {}
  }
]
```
506

```
{
  "name": "motion-detection",
  "module": "motiondetect",
  "trigger": "rgb-camera",
  "settings": {}
}
```
508

```
"mapping": {
  "rgb-camera": ["rgb-writer"],
  "motion-detection": ["db-writer"]
}
```
510

FIG. 5

BUILDING AND DEPLOYING AN EDGE DATA PIPELINE APPLICATION

BACKGROUND

The Internet of Things (IoT) is a phrase given for the interconnection of computing devices scattered around the globe within the existing internet infrastructure. IoT devices (also referred to herein as edge devices) may be used for a variety of consumer and commercial applications. For example, a security system for a home or business may use multiple cameras and different types of sensors. A security application may receive video streams from the different cameras and sensors as input and may send video data or sensor data to a destination, where it may be viewed at a later time.

Due to high volumes of data that may be received from data sources such as cameras and sensors, it may be inefficient and costly to save all of the data. For example, it may be wasteful and inefficient to save video data during times when there are no people or objects of interest in a camera's field of view, because a user may have no desire to review such video data. In order to limit the saving or reporting of data to data of potential interest, an application may only save certain types of data (e.g., video data that represents a person or object that is moving). However, developing an application that can synchronize data from multiple data sources and route the data to various destinations in an efficient manner can be a difficult, error-prone, and time-consuming process.

BRIEF DESCRIPTION OF THE DRAWINGS

FIG. 5 illustrates a diagram of module specifications for an edge data pipeline application, according to some embodiments

Figure 1:
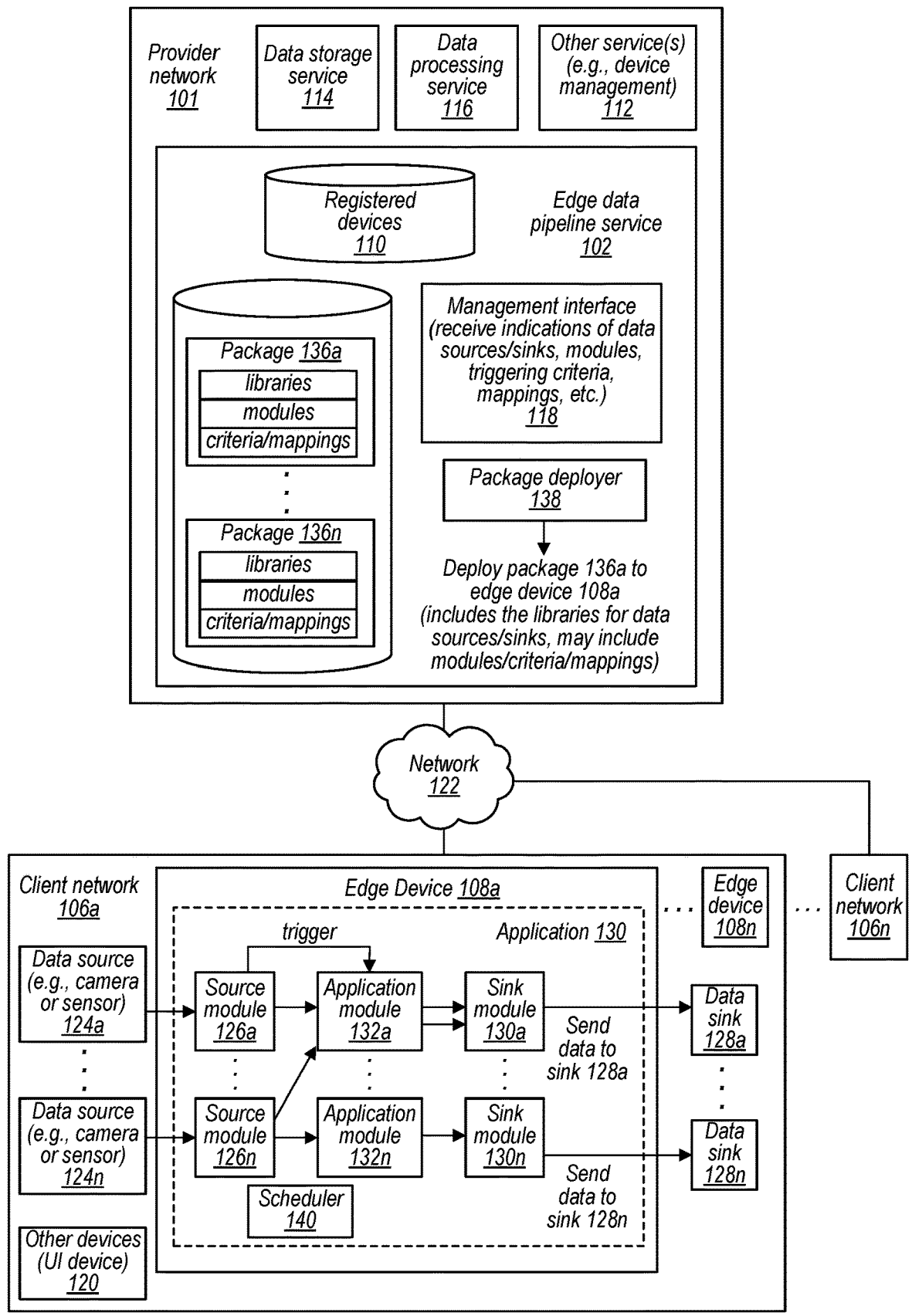
FIG. 1 illustrates a system for building and deploying an edge data pipeline application, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

The systems and methods described herein implement techniques for building and deploying an edge data pipeline application. In various embodiments, a user may provide, to an edge data pipeline service of a service provider network, information (e.g., indications or specifications) that describes how data from data sources is to be routed and/or processed. The edge data pipeline service may then build a package based on the information and deploy the package to an edge device in order for the edge device to implement an edge data pipeline application that routes and/or processes data. In embodiments, the automatic building and deployment of an edge data pipeline application by an edge data pipeline service may allow clients to implement an edge data pipeline application much faster, with fewer bugs/errors, less testing, and using fewer software and/or hardware resources compared to traditional techniques.

In embodiments, the edge data pipeline service may receive, from the client (e.g., a user/administrator), indications for any number of data sources (e.g., cameras, sensors), data sinks (e.g., video files, databases), and application modules (e.g., motiondetect, anomalydetect) to be used by an edge data pipeline application at an edge device. The indications may specify any number of settings for the data sources, data sinks, and/or application modules in order for the edge data pipeline application to be implemented (e.g., configured/executed) in a particular way.

In some embodiments, the indications from the client may indicate a mapping that maps any number of data sources to any number of data sinks and one or more criteria that, when satisfied, causes an application module to send data from one or more of the data sources to one or more of the data sinks according to the mapping. For example, the mapping may map video data from a camera to a video writer and may map inertial measurements from an inertial measurement sensor to a database writer. In an embodiment, derived data (e.g., metadata) may also be sent to one or more of the data sinks.

In various embodiments, the edge data pipeline application may implement a scheduler that synchronizes delivery of data from different data sources to an application module such that different portions of data received from different data sources by the application module at a particular time were generated by the different data sources at the same time. For example, different video clips from three different cameras that were recorded at a particular time (e.g., time window) may be delivered to the application module at the same time (e.g., in synch with each other).

FIG. 1 illustrates a system for building and deploying an edge data pipeline application, according to some embodiments.

In embodiments, the provider network 101, the edge data pipeline service 102, the application 104, and/or any other components depicted in FIG. 1 may be the same as (or include one or more of the same components) as any components depicted in any of FIGS. 2-7. FIG. 8 depicts an example computer system(s) that may implement the services, applications, networks, and/or any other components depicted in any of FIGS. 1-7.

In embodiments, the edge data pipeline service 102 may build and deploy an edge data pipeline application to any number edge devices of any given client (e.g., an entity such as a private company, an individual, or a public organization). For example, a client may own/manage the client network 106a, which may include any number of edge devices 108a-108n. As shown, the edge data pipeline service 102 may build and deploy an edge data pipeline application for edge devices for any number of clients that each own/manage one or more client networks. For example, another client may own/manage the client network 106n.

In the depicted embodiment, the edge data pipeline service 102 may store information for any number of edge devices in the data store registered devices 110 for use by the edge data pipeline service 102 to perform any of the actions discussed herein for a given edge device or package/application. For example, registered devices 110 may store unique device IDs, data sources and/or data sinks available to an edge device, a hardware/software configuration of the edge device, and network address of the edge device.

In embodiments, any of the edge device data may instead be stored by another service 112 (e.g., a device management service) that is accessible to the edge data pipeline service 102. In embodiments, at least some of the storage and/or data processing functions of the edge data pipeline service 102 may be performed by another data storage service 114 or another data processing service 116 of the provider network.

In some embodiments, a user (e.g., administrator) of a client may provide input data to the edge data pipeline service 102 via a management interface 118 (e.g., an application programming interface (API)), which is used by the edge data pipeline service 102 to build and deploy an edge data pipeline application to an edge device(s). The user may provide input using a user interface of a local device that is either a stand-alone device (e.g., a smart phone or laptop) that is external to the client's network or a device that is part of the client network 106 (e.g., other device 120). For example, the user interface may be a graphical user interface (GUI) or a command line interface (CLI). In embodiments, any services/components of the provider network 101, any devices of the client networks 106, and any other devices mentioned herein may communicate with each other via a wide area network 122 (e.g., the Internet).

In embodiments, the edge data pipeline service 102 may receive, from the client via a management interface 118, indications of any number of data sources 124 of a network of the client (e.g., cameras, sensors). In embodiments, to receive the indications of the data sources, the service may receive indications for different data source modules 126a-126n of an application that are to be used to receive data from each data source.

For example, the service may receive, from the client, an indication of a camera module to be used to receive data from a particular camera, as well as any number of settings/parameters to be used to configure the camera module for implementation as part implementing an application 104. In embodiments, to indicate the camera module, the client (e.g., user) may select the module (e.g., the camera model) from among a list of any number of different data source modules available for selection (e.g., different data source modules configured to receive data from different types/models of cameras and for different types/models of sensors).

In the depicted embodiment, the service 102 may also receive, from the client via the management interface 118, indications of any number of data sinks 128 of the client (e.g., video files, databases). In embodiments, to receive the indications of the data sources, the service may receive indications for different data sink modules 130a-130n of an application that are to be used to receive data from each data source.

For example, the service may receive, from the client, an indication of a database writer module to be used to send data to a particular database writer at the client's network (e.g., data sink 128a), as well as any number of settings/parameters to be used to configure the database writer module for implementation as part implementing the application 104. In embodiments, to indicate the database writer module, the client (e.g., user) may select the module (e.g., the database writer model) from among a list of any number of different data sink modules available for selection (e.g., different data sink modules configured to send data to different types of database writers, databases, video files, or any other type of software and/or hardware device).

In embodiments, the service 102 may also receive, from the client via the management interface 118, indications of any number of different application modules 132 of the application. The indication for a given application module (e.g., application module 132a) may include a mapping, where the mapping maps any number of the data sources to any number of the data sinks. The indication for a given application module (e.g., application module 132a) may also include one or more criteria that, when satisfied by data received from one or more of the data sources (e.g., data source 124a), causes the module to send data from at least one data source to at least one data sink according to the mapping (e.g., triggering the sending of the data). In some embodiments, the indication of the modules, mapping, and/or criteria may be provided by the client after the package is deployed, as discussed for FIG. 6 below.

In an embodiment, a mapping may map data sources to data sinks. For example, the mapping for application module 132a may map data source 124a to data sink 128a and may map data source 124n to data sink 128a. When the application is implemented on the edge device, based on the indicated mapping, the application may implement the source modules 126a, 126n to respectively receive data from the data sources 124a, 124n and to send/forward the data from the data sources 124a, 124n to the application module 132a; and the application may implement the sink module 130a to receive that data from the application module 132a and to forward that data to the data sink 128a. This may allow data to flow from the data source 124a to data sink 128a and from data source 124n to data sink 128a. As described below, a user may instead map data source modules to data sink modules to achieve the same data flow.

In some embodiments, the mapping may instead map any number of the data source modules 126 to any number of the data sink modules 130. For example, the mapping for application module 132a may map data source module 126a to data sink module 130a and may map data source module 126n to data sink module 130a.

As described above, when the application is implemented on the edge device, based on the indicated mapping, the application may implement the source modules 126a, 126n to respectively receive data from the data sources 124a, 124n and to send/forward the data from the data sources 124a, 124n to the application module 132a; and the application may implement the sink module 130a to receive that data from the application module 132a and to forward that data to the data sink 128a. This may allow data to flow from the data source 124a to data sink 128a and from data source 124n to data sink 128a.

In the example embodiment, based on the indications of the plurality of data sources, data sinks, and/or modules for a particular application 104 to be implemented on an edge device (e.g., edge device 108a), the edge data pipeline service may build/generate a package 136 for the edge device and store the package to a data store (e.g., package 136a). A package may include any configuration data, libraries (e.g., software code), and/or any other data that may be used by the edge device to implement the application 104, in order for the application to communicate with any of the indicated data sources and/or data sinks (e.g., data/code for the modules, data sources, and data sinks indicated by the user). A package may include the modules, the triggering criteria, and/or the mappings. However, in embodiments, the package may not include the modules, the triggering criteria, and/or the mappings because the indication of the modules, mapping, and/or criteria may be provided by the client after the package is deployed, as discussed for FIG. 6 below. As shown, the service may store any number of packages that each correspond to a different edge device.

In embodiments, after the service builds the package, the service deploys the package to the edge device. In various embodiments, the service may deploy the package automatically (e.g., in response to completion of the building/generation of the package) or the service may deploy the package in response to receiving a request from a user to deploy the package (e.g., via the management interface 118).

In embodiments, the package may be configured to, subsequent to deployment to the edge device by the package deployer 138 (e.g., to edge device 108a), cause the edge device to implement the application 104 (e.g., within an execution environment and/or container). For example, for each module, the edge device may connect the module to one or more particular data sources 124 (e.g., via one or more particular data source modules 126) that are to be used as triggering sources, connect the module to one or more data sources 124 (e.g., via data source modules 126) and to one or more data sinks 128 (e.g., via data sink modules 130) according to the mapping for the module, cause the module to receive data (e.g., a particular portion of data) from the one or more particular data sources data sources 124 (e.g., via the one or more particular data source modules 126), and in response to determining that the one or more criteria are satisfied by the data (e.g., the particular portion of data) received from the one or more particular data sources, cause the module to send the data (e.g., the particular portion of data) from one or more of the data sources to the one or more of the data sinks according to the mapping.

In various embodiments, a scheduler 140 may be implemented as part of implementing the application. The scheduler may synchronize delivery of data from any number of data sources to a given module such that different portions of data received from the different data sources by the module at a particular time (or time window) were generated by the different data sources at the same particular time (or same time window).

For example, if a video clip of camera A, a video clip of camera B, and an audio clip from a microphone were each generated by camera A, camera B, and the microphone at during the same time window (e.g., from 10:00 pm to 10:01 pm), then the module will receive a one-minute video stream from each video clip at the same one-minute time window. By synchronizing the data delivered to a module from different sources, the module may not need to take into account any differences or discrepancies between different sources with respect to timekeeping (e.g., clocks at different sources may not by in synch with each other).

In a mapping may map derived data to a data sink. Derived data may be any type of data (e.g., metadata) that is generated by the module based on processing of the data that is received from one or more data sources (e.g., via data source modules). For example, the data may be a tag that indicates motion was detected in a video stream, or a tag that indicates an anomaly was detected in a stream of data.

In embodiments, the derived data may include a command that is configured to cause a device of the client network 106 to perform an action. For example, the module may determine, based on video data, that the ambient lighting for an area is below a desired threshold of lighting and in response, the module may generate a command that is sent to a particular light fixture (e.g., specified as a data sink), in order to cause the light to turn on.

In various embodiments, any number of data sources may be used as trigger sources that trigger a module to send data from data source(s) to data sink(s) according to the mapping. For example, a data source may act as a triggering data source, whereas the mapping causes the module to send data from on or more other data sources to one or more data sinks. However, in some cases, a user may specify the triggering data source as part of the mapping as well. Therefore, the module may also send data from the trigger source to one or more data sinks based on the mapping. Therefore, in embodiments, any number of different combinations of data flow from data sources to data sinks may be configured for an application by a user.

In some embodiments, a module may send data to one or more data sinks that are at a remote destination (e.g., at the provider network or another remote network). For example, the mapping may indicate the data storage service 114 or the data processing service 116 as data sinks. In embodiments, if connectivity between the client network and the remote network is lost, then the application will send the data to another storage location.

For example, in response to the application determining that the module is unable to send a data (or a particular portion of data) from the data source to the remote destination, the module may send the data (or the portion of data) from data source to a local data store at the client's network. Upon determining that the module is able to resume sending data to the remote destination (e.g., connectivity has been restored), then the module may resume sending data to the remote destination and the application may also cause the data that was stored at the local data store to be sent to the remote destination. This may allow the remote destination to avoid losing data due to loss of connectivity.

In embodiments, a user may describe (e.g., via providing input to the service) a data ingestion pipeline that uses any number of data sources, data sinks, and application modules. The service may generate a configuration file (e.g., a package 136) that includes the data/information/code needed for an edge device to implement an application (e.g., application 104) that implements the data ingestion pipeline described by the user. In embodiments, to implement the application, the edge device executes code within an execution environment of the edge device (e.g., within a container).

In some embodiments, when the application is initialized/configured by the edge device, a mapping phase connects each of the application modules to both data sources (e.g., data source modules) and to data sinks (e.g., data sink modules) using software handles. In embodiments, the source data is pushed/delivered from the data sources/data source modules to the application modules and to the data sinks/data sink modules (e.g., without the need to use a pub/sub mechanism).

In various embodiments, an application module acts as one or more switches for routing data from data sources, with software logic for deriving additional information/metadata (e.g., metadata that indicates motion detection or that an anomaly is present). For example, an application module may generate a flag (e.g., "in_motion" or "anomaly_present") that is used to route data from a data source (e.g., via a data source module) to a data sink. If the condition is met (e.g., a flag is generated for motion detection) and the mapping allows data flow, source data will be passed to a sink according to the mapping. Each source may be handled separately, but synchronization may be maintained by a scheduler through buffering.

In some embodiments, a user may wish to change/update the mapping (e.g., due to adding or removing data sources and/or data sinks). The provider network may receive indications from the user (e.g., via the interface 118) of the updated mapping. In response, the service may send the updated mapping to the edge device. The edge device/application may receive, from the provider network, an indication of the updated mapping for the module (the updated mapping may map any number of new data sources to one or more of the existing data sinks, the updated mapping may map one or more of the existing data sources to any number of new data sinks, or the updated mapping may map any number of new data sources to any number of new data sinks). In response, the edge device/application may apply the updated mapping to the module.

Figure 2:
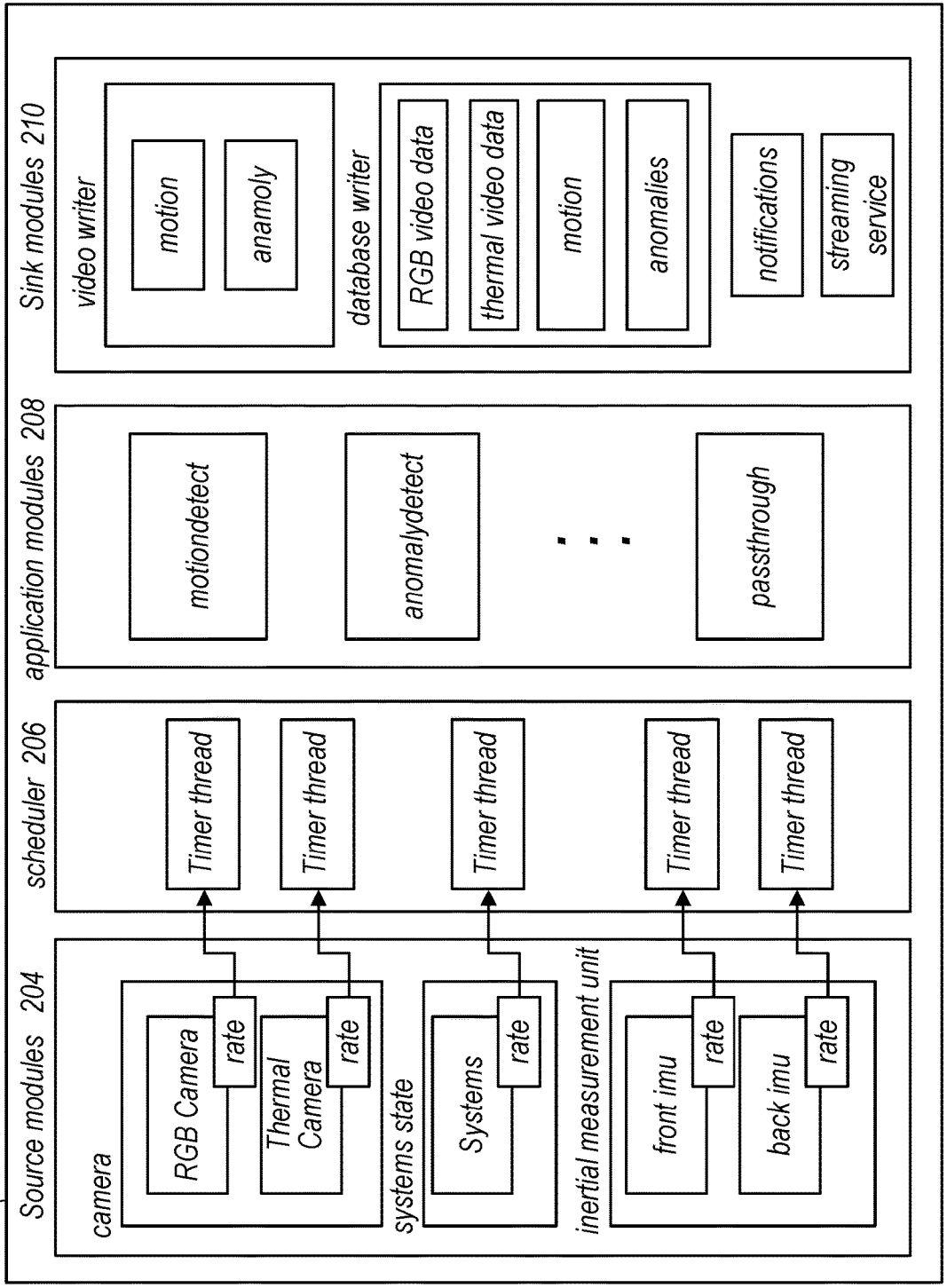
FIG. 2 illustrates a diagram of an edge data pipeline application at an edge device, according to some embodiments.

FIG. 2 illustrates a diagram of an edge data pipeline application at an edge device, according to some embodiments.

In the depicted example, after deployment of a package (e.g., package 136a) to an edge device, the edge device may implement the application 202 based on the package (e.g., by executing code included in the package). In embodiments, the package may include code/instructions that the edge device may implement/execute in order to configure and/or execute the application.

The depicted application 202 includes source modules 204, a scheduler 206 that synchronizes delivery of data from the source modules 204 to the application modules 208, and data sink modules 210 that send data and/or derived data to sink modules 210. The source modules include two different types of cameras (a red-green-blue (RGB) camera and a thermal camera), an application that reports a state of a computing system, and two inertial measurement units (a front IMU and a back IMU). In an embodiment, the application 202 may be implemented by an edge device of a vehicle or other mobile system.

The application modules 208 include a "motiondetect" module that implements logic/code (e.g., a machine learning (ML) model) to determine whether motion is detected within a portion of a video stream from a camera/source module (e.g., a person or other object represented in the video stream is in motion for during at least some of the video stream), an "anomalydetect" module that implements logic/code (e.g., a machine learning (ML) model) to determine whether an anomaly is detected within a portion of data from a source module (e.g., data values that deviate from an average data value by at least a threshold amount), and a "passthrough" module (e.g., a module that allows data from one or more source modules to be routed to one or more sink modules if one or more criteria are met for data from at least one particular source module). In some embodiments, a passthrough module may pass data from one or more particular data sources to one or more data sinks in response to receiving the data from the one or more particular data sources (e.g., any data received at the module is simply passed through).

In various embodiments, any number of other types of application modules may be used. For example, the application modules 208 may include a "brightness" module that implements logic/code (e.g., a machine learning (ML) model) to determine whether a level of brightness is detected within a portion of a video stream from a camera/source module (e.g., at least a threshold level of brightness is represented in the video stream during at least some of the video stream). In embodiments, the application modules 208 may include a "code" or "tag" module that implements logic/code (e.g., a machine learning (ML) model) to determine whether a quick response (QR) code or other type of tag is detected within at least a portion of a video stream.

The sink modules 210 include a video writer (e.g., an application) that writes video to a video file or other type of data store. For example, if the motiondetect module detects motion in a portion of a video stream from the RGB camera source module, then the passthrough module may send the portion of the video stream to the video writer, which writes may write the portion of the video stream to a video file, associating a "motion" tag (derived metadata) with the saved video stream. Similarly, if the anomalydetect module detects an anomaly in a portion of a video stream from the RGB camera source module, then the passthrough module may send the portion of the video stream to the video writer, which writes may write the portion of the video stream to a video file, associating an "anomaly" tag (derived metadata) with the saved video stream.

The sink modules 210 also include a database writer (e.g., an application) that may write metadata (e.g., derived data) to a database to indicate different types of data that were identified and/or detected and/or sent to the video writer by an application module. For example, the database writer may write metadata that indicates/identifies video data that was received from the RGB camera or the thermal camera, video data received from either camera with motion present, or video data received from either camera with anomalies present.

The sink modules 210 may also include a destination for an application module to send a notification to (e.g., via email, text, or other message). For example, a notification may be sent to an administrator or machine operator, indicating that an anomaly was detected in data from one or more source modules (e.g., from one or more data sources that provide the data). The sink modules 210 may also include a streaming service as a destination for an application module to send video streams to (e.g., a streaming service at the client's network or at the remote service provider network).

In the example embodiment, the scheduler implements a timer thread for each of the source modules. The timer thread may receive data from a source module at a certain rate (e.g., video data at 10 frames per second). The scheduler may use the timer threads to align and/or modify the data received from different sources in order to synchronize the data, as described herein. In embodiments, the timer threads may utilize buffers in order to synchronize data between multiple different sources, before the data from the different sources is delivered to a module as synchronized data.

Figure 3:
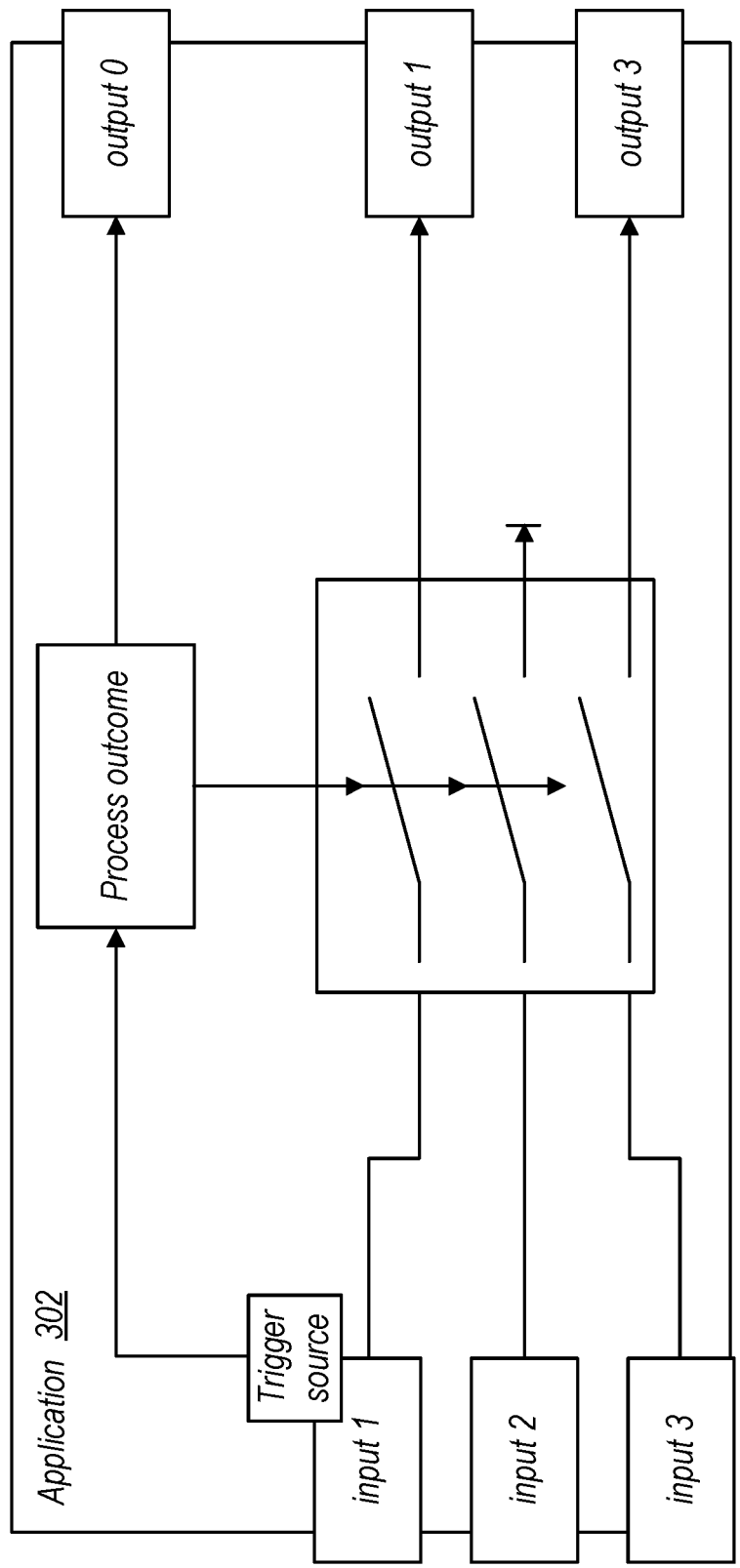
FIG. 3 illustrates a diagram of an edge data pipeline application at an edge device, according to some embodiments.

FIG. 3 illustrates a diagram of an edge data pipeline application at an edge device, according to some embodiments.

In the depicted embodiment, input 1, input 2, and input 3 represent data inputs from different source modules (e.g., from different data sources) that is sent to an application module 302 of an application. Output 0, output 1, and output 3 represent data outputs for different data sinks.

As shown, input 1 is used as the trigger source. Therefore, when the data from input 1 meets one or more criteria, the "process outcome" logic causes the data from input 1 to flow to output 0 and output 1 and the data from input 3 to flow to output 3. As shown, there is no path for data from input 2 to flow to an output. This may be due to the mapping provided by the user, which only includes mappings for a source module that corresponds to input 1 and for another source module that corresponds to input 3.

Figure 4:
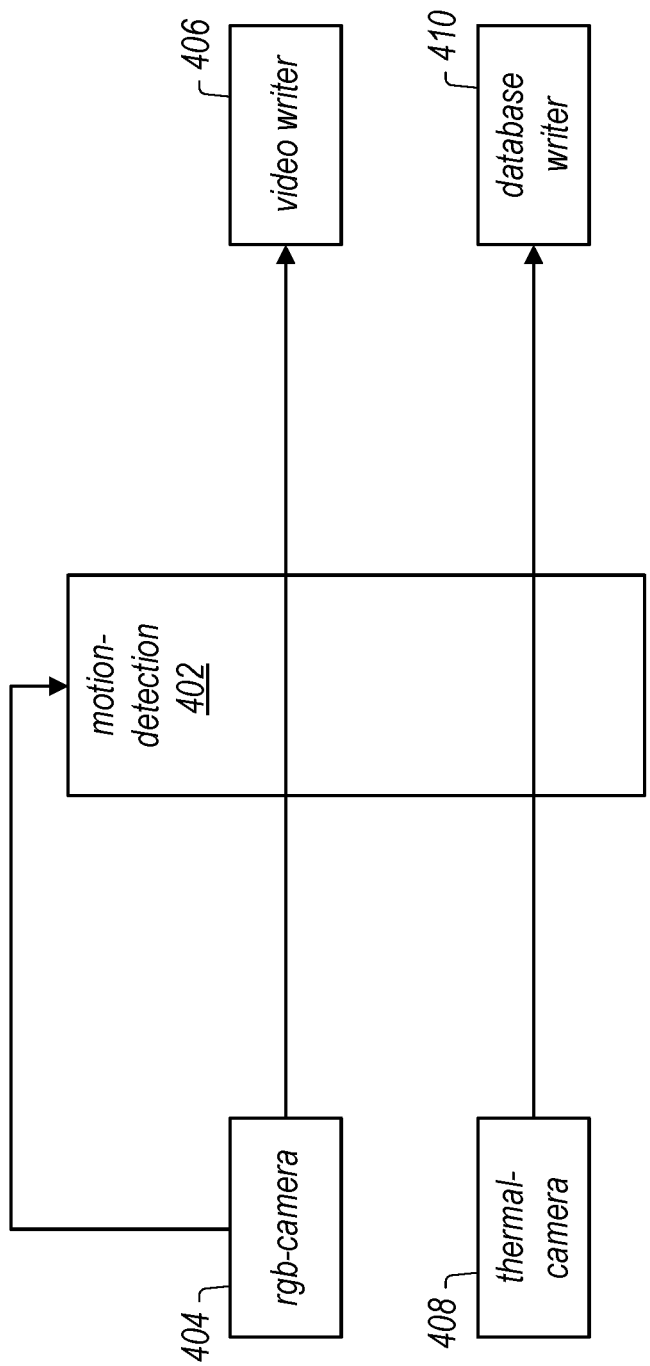
FIG. 4 illustrates a diagram of an edge data pipeline application at an edge device, according to some embodiments.

FIG. 4 illustrates a diagram of an edge data pipeline application at an edge device, according to some embodiments.

As shown, a motion detection module 402 routes data from an RGB camera 404 to a video writer 406 and routes data from a thermal camera 408 to a database writer 410. In the depicted embodiment, the RGB camera also acts as the trigger source. When one or more criteria are met by the data from the RGB camera (e.g., motion is detected in the video data), then the video data from the RGB camera is sent to the video writer 406 for writing to a video file, and the video data from the thermal camera 408 is sent to the database writer 410 for writing the video data and/or metadata derived from the video data to a database.

FIG. 5 illustrates a diagram of module specifications for an edge data pipeline application, according to some embodiments.

In the example embodiment, sources 502 represents specifications that may be provided by a user to indicate an RGB camera data source module that is to be implemented by an application to route data from an RGB camera and a thermal camera data source module that is to be used by the application to route data from a thermal camera. The sinks 504 represents specifications that may be provided by a user to indicate a video writer data sink module that is to be implemented by the application to route data from a motion detection module to a video writer and a database writer data sink module that is to be implemented by the application to route derived data (derived from the video data) from the motion detection module to a database writer.

As shown, the specification for the motion detection module 506 includes specified criteria 508 that, when met by video data received from the RGB camera, cause the motion detection module 506 to route the video data from the motion detection module 506 to the video writer and to route derived data (derived from the video data) from the motion detection module 506 to the database writer. As shown, the specified criteria may by specified through any number of settings (e.g., a movement detection value calculated using the video data, where the value must be met in order to trigger the module).

The specification for the motion detection module 506 also includes a mapping 510 that indicates the routing of data from the motion detection module 506 to data sink modules. As shown, the video data from the RGB camera is mapped to the video writer data sink module and the derived data from the motion detection module 506 is mapped to the database writer data sink module.

Figure 6:
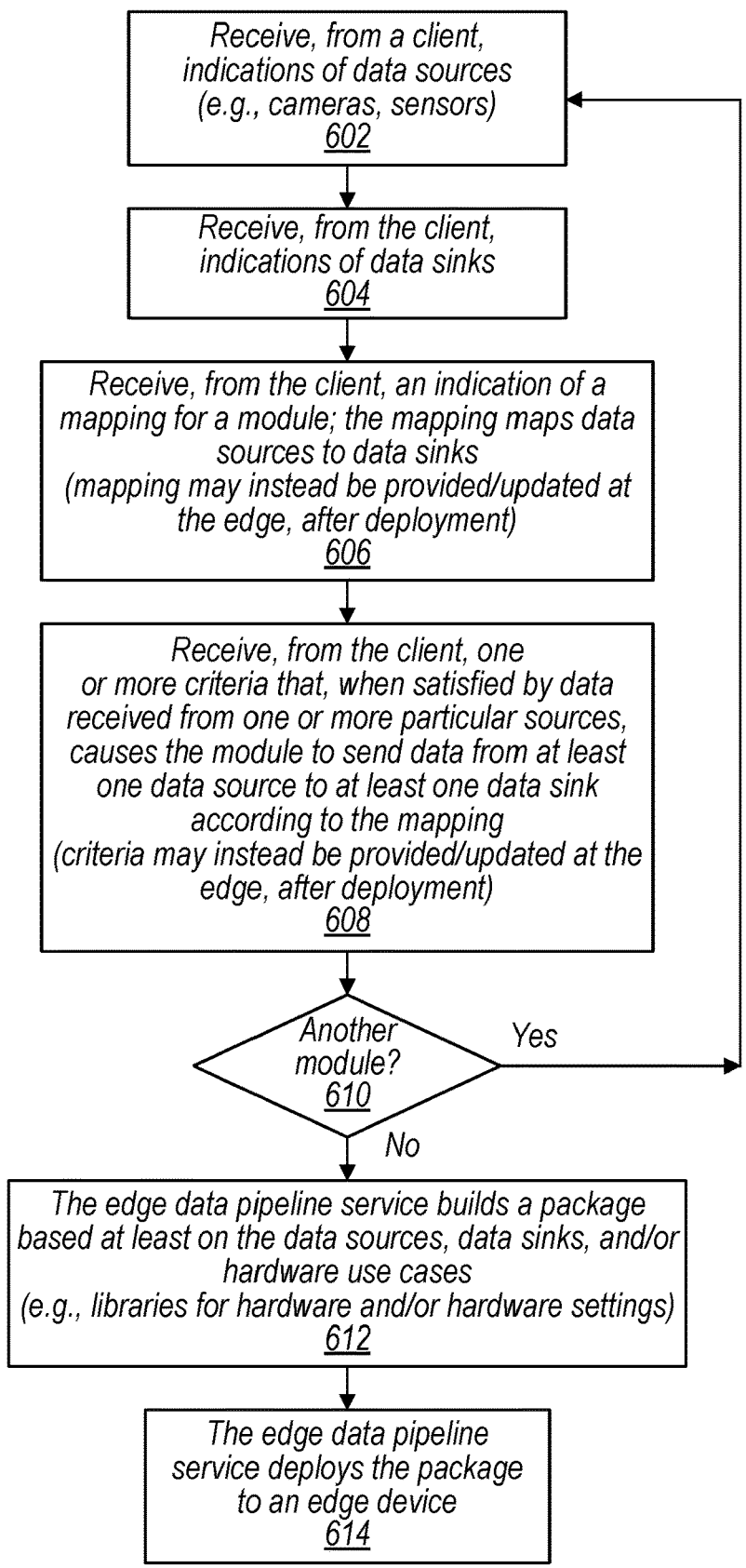
FIG. 6 is a flow diagram that illustrates building and deploying an edge data pipeline application, according to some embodiments.

FIG. 6 is a flow diagram that illustrates building and deploying an edge data pipeline application, according to some embodiments.

At block 602, an edge data pipeline service receives, from a client, indications of data sources at the client's network (e.g., hardware and/or software sources such as cameras, sensors, applications). In embodiments, the indications may include specifications for data source modules, including any number of settings/parameters. At block 604, the edge data pipeline service receives, from the client, indications of data sinks (e.g., hardware and/or software sinks, such as video writers, database writers). In embodiments, the indications may include specifications for data sink modules, including any number of settings/parameters.

At block 606, the edge data pipeline service receives, from the client, an indication of a mapping for an application module; the mapping maps data source(s) to data sink(s) and/or maps derived data to data sink(s). In embodiments, block 606 may instead be performed after the package has been deployed to the edge device (e.g., after block 614). In some embodiments, the mapping may be modified/updated after the package has been deployed.

At block 608, the edge data pipeline service receives, from the client, one or more criteria that, when satisfied by data received from one or more particular data sources, causes the application module to send data from at least one data source to at least one data sink according to the mapping. In embodiments, the client may indicate other specifications for the application module, including any number of settings/parameters. In embodiments, block 608 may instead be performed after the package has been deployed to the edge device (e.g., after block 614). In some embodiments, the criteria may be modified/updated after the package has been deployed.

At block 610, the edge data pipeline service determines whether the client will provide indications for another module to be used in the application at the edge device. If so, then the process returns to block 602. If not, then at block 612, the edge data pipeline service builds a package based at least on the indications for the data sources (or data source modules), data sinks (or data sink modules), and/or application modules. In embodiments, the package may include libraries (e.g., software code) that allow an application (e.g., application 130 of FIG. 1) to be used with the data sources and/or the data sinks specified by the client at blocks 602 and 604. For example, the libraries may allow an application to be configured for use with certain hardware (e.g., cameras, sensors, or other hardware) and/or for certain hardware use cases (e.g., cameras, sensors, or other hardware that are configured for a particular use case according to certain settings such as a video frame rate).

At block 614, the edge data pipeline service deploys the package to the edge device, where the application is implemented by the edge device based on the package. In embodiments, the implementation of the application may include implementing/executing the libraries in order to configure the application to be used with the specified data sources and/or the data sinks (e.g., for certain hardware and/or hardware settings). This may allow the application to communicate with the data sources and/or the data sinks (e.g., send data to and/or receive data from the data sources and/or the data sinks).

In some embodiments, the client (e.g., a user) may use a local device/user interface to initially provide and/or to update the mapping and/or triggering criteria, and the application is implemented according to the mapping and/or triggering criteria (e.g., performs the connections/mapping phase described for FIG. 1). For example, after receiving the package at the edge device, the client may provide the indication of the mapping and/or the indication of the one or more criteria that cause the data flow according to the mapping. In embodiments, the client may update/modify the mapping and/or the criteria. For example, the client may provide, to the edge device/application, an indication of an updated mapping for a module, where the updated mapping changes the mapping of one or more of the data sources to a different one or more of the sinks. As another example, the client may change one or more of the data sources that are used as triggering data sources (e.g., used to implement the triggering criteria). This may allow a client to change the configuration/operation of the edge data pipeline for an edge device, without the need for connectivity with the provider network (e.g., without internet connectivity).

In embodiments, the client may need to use the service in order to generate and deploy a new package. For example, if a new type of hardware (e.g., sensor or camera) is added to the local client network, the client may need to perform at least some of the above actions (e.g., blocks 602-614) in order to build a new package that includes new libraries for the new type of hardware. Similarly, to implement a new use case (e.g., different settings for existing hardware devices/sensors/cameras), then the client may need to perform at least some of the above actions (e.g., blocks 602-614) in order to build a new package that includes new libraries for the new use case (e.g., different settings for existing hardware devices/sensors/cameras). However, if the client wishes to remove one or more data sources and/or data sinks, then the client may simply use a local device/user interface to update/modify the mapping so that the one or more data sources and/or data sinks are no longer included in the mapping (without the need to use the service to build and deploy a new package).

Figure 7:
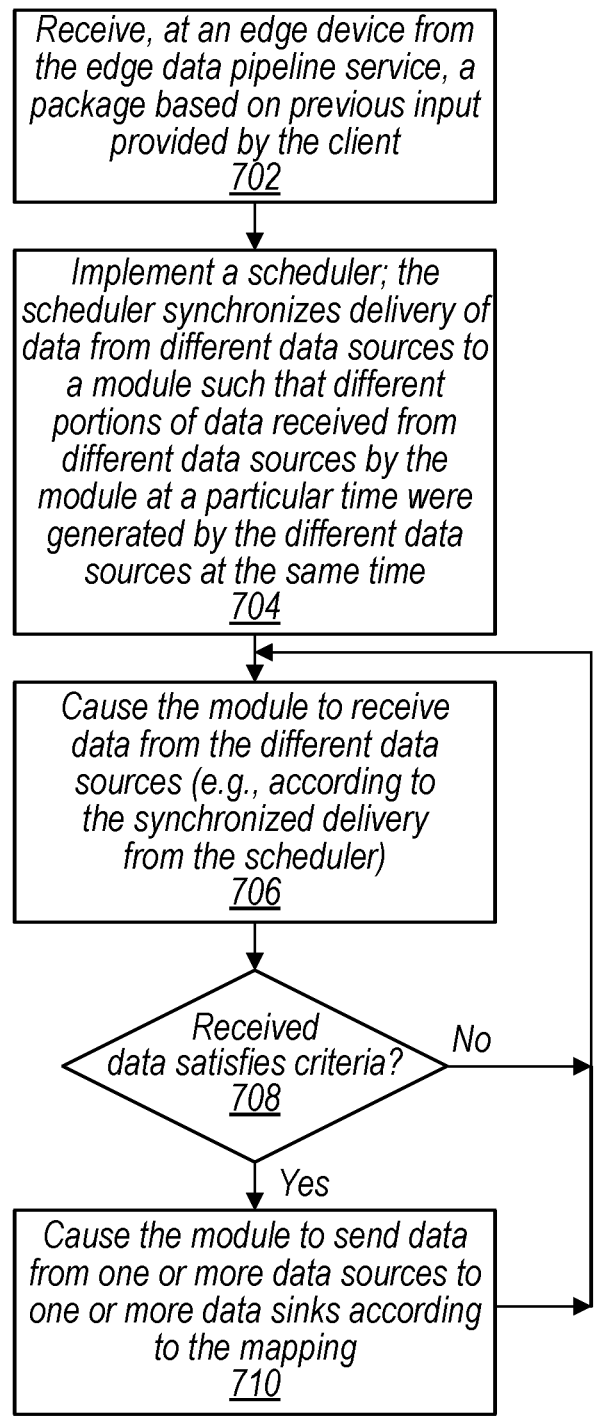
FIG. 7 is a flow diagram that illustrates implementing an edge data pipeline application, according to some embodiments.
Figure 8:
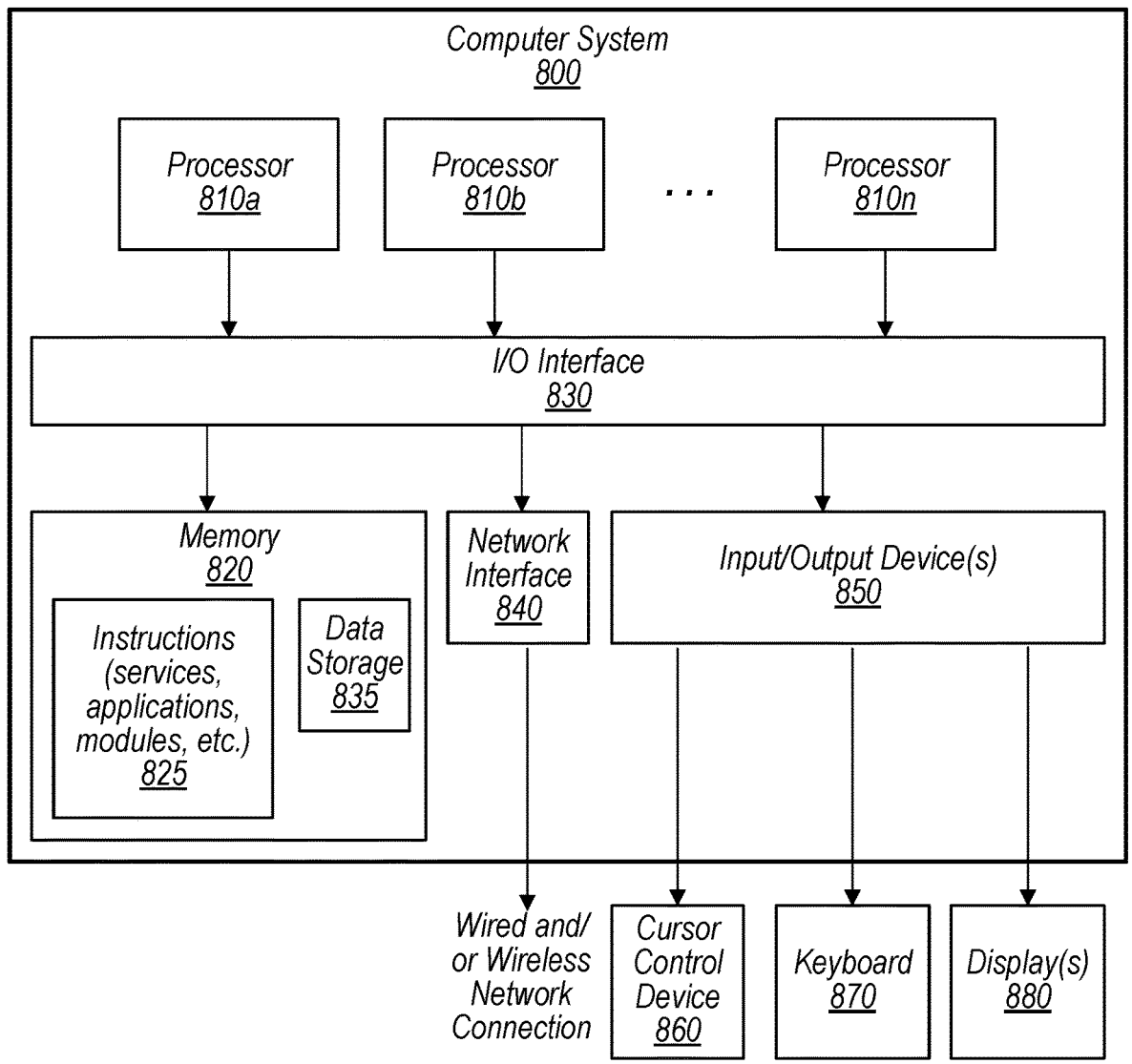
FIG. 8 is a block diagram illustrating an example computer system that implements some or all of the techniques described herein, according to some embodiments.

FIG. 7 is a flow diagram that illustrates implementing an edge data pipeline application, according to some embodiments.

At block 702, the edge device receives, from the edge data pipeline service, a package that was generated/built based on previous input (e.g., indications) provided by the client to the edge data pipeline service. In embodiments, the edge device then implements the application based on the package, which may include any number of the functions, as described herein.

At block 704, the edge device implements a scheduler. The scheduler may synchronize deliver of data from different data sources (or data source modules) to a module such that different portions of data received from different data sources (or data source modules) by the module at a particular time were generated by the different data sources at the same time. At block 706, the edge device causes the module to receive data from the different data sources (e.g., according to the synchronized delivery from the scheduler).

At block 708, the module(s) determine whether the received data satisfies one or more criteria. If not, then the process returns to block 706, where the module continues to receive data form the different data sources. If the one or more criteria are satisfied, then at block 710, the edge device causes the module to send data from the one or more data sources to one or more data sinks and/or to send derived data to one or more data sinks according to the mapping.

Any of various computer systems may be configured to implement processes associated with the services, applications, modules, or any components of the above figures. For example, FIG. 8 is a block diagram illustrating an example computer system that implements some or all of the techniques described herein, according to some embodiments.

In various embodiments, the services, applications, modules, or any components of any of FIGS. 1-7 may be implemented by one or more computer systems 800 such as that illustrated in FIG. 8. In embodiments, any of the components of any of FIGS. 1-7 may include one or more components of the computer system 800 that function in a same or similar way as described for the computer system 800.

In the illustrated embodiment, computer system 800 includes one or more processors 810 coupled to a system memory 820 via an input/output (I/O) interface 830. Computer system 800 further includes a network interface 840 coupled to I/O interface 830. In some embodiments, computer system 800 may be illustrative of servers implementing enterprise logic or downloadable application, while in other embodiments servers may include more, fewer, or different elements than computer system 800.

In various embodiments, computer system 800 may be a uniprocessor system including one processor 810, or a multiprocessor system including several processors 810 (e.g., two, four, eight, or another suitable number). Processors 810 may be any suitable processors capable of executing instructions. For example, in various embodiments, processors 810 may be embedded processors implementing any of a variety of instruction set architectures (ISAs), such as the x86, PowerPC, SPARC, or MIPS ISAs, or any other suitable ISA. In multiprocessor systems, each of processors 810 may commonly, but not necessarily, implement the same ISA.

System memory 820 may be configured to store instructions and data accessible by processor 810. In various embodiments, system memory 820 may be implemented using any suitable memory technology, such as static random access memory (SRAM), synchronous dynamic RAM (SDRAM), non-volatile/Flash-type memory, or any other type of memory. In the illustrated embodiment, program instructions and data implementing desired functions, such as those methods and techniques described above (e.g., for the edge data pipeline service, application, modules, services, etc.), are shown stored within system memory 820 as program instructions 825. In some embodiments, system memory 820 may include data 835 which may be configured as described herein.

In one embodiment, I/O interface 830 may be configured to coordinate I/O traffic between processor 810, system memory 820 and any peripheral devices in the system, including through network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810).

In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments, some or all of the functionality of I/O interface 830, such as an interface to system memory 820, may be incorporated directly into processor 810.

Network interface 840 may be configured to allow data to be exchanged between computer system 800 and other computer systems 800 or devices attached to a network, such as the local network discussed above, a wide-area network, or a local network within the provider network, for example. In particular, network interface 840 may be configured to allow communication between computer system 800 and/or various I/O devices 850. I/O devices 850 may include scanning devices, display devices, input devices and/or other communication devices, as described herein. Network interface 840 may commonly support one or more wireless networking protocols (e.g., Wi-Fi/IEEE 802.11, or another wireless networking standard). However, in various embodiments, network interface 840 may support communication via any suitable wired or wireless general data networks, such as other types of Ethernet networks, for example. Additionally, network interface 840 may support communication via telecommunications/telephony networks such as analog voice networks or digital fiber communications networks, via storage area networks such as Fibre Channel SANs, or via any other suitable type of network and/or protocol.

In some embodiments, system memory 820 may be one embodiment of a computer-accessible medium configured to store program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 800 via I/O interface 830. A computer-readable storage medium may also include any volatile or non-volatile media such as RAM (e.g., SDRAM, DDR SDRAM, RDRAM, SRAM, etc.), ROM, etc., that may be included in some embodiments of computer system 800 as system memory 820 or another type of memory. Further, a computer-accessible medium may include transmission media or signals such as electrical, electromagnetic, or digital signals, conveyed via a communication medium such as a network and/or a wireless link, such as may be implemented via network interface 840.

In some embodiments, I/O devices 850 may be relatively simple or "thin" client devices. For example, I/O devices 850 may be configured as dumb terminals with display, data entry and communications capabilities, but otherwise little computational functionality. However, in some embodiments, I/O devices 850 may be computer systems configured similarly to computer system 800, including one or more processors 810 and various other devices (though in some embodiments, a computer system 800 implementing an I/O device 850 may have somewhat different devices, or different classes of devices).

In various embodiments, I/O devices 850 (e.g., scanners or display devices and other communication devices) may include, but are not limited to, one or more of: handheld devices, devices worn by or attached to a person, and devices integrated into or mounted on any mobile or fixed equipment, according to various embodiments. I/O devices 850 may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 800. In general, an I/O device 850 (e.g., cursor control device 860, keyboard 870, or display(s) 880 may be any device that can communicate with elements of computing system 800.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein (e.g., the functionality of the certificate revocation manager, the services, etc.).

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g., SDRAM, DDR, RDRAM, SRAM, etc.), ROM, etc., as well as transmission media or signals such as electrical, electromagnetic, or digital signals, conveyed via a communication medium such as network and/or a wireless link.

What is claimed is:

1. A system, comprising:
one or more processors and one or more memories, wherein the one or more memories have stored thereon instructions, which when executed by the one or more processors, cause the one or more processors to implement an edge data pipeline service for a plurality of clients of a provider network, wherein the edge data pipeline service is configured to, for a client of the plurality of clients of the edge data pipeline service:
receive, from the client via a management interface:
indications of a plurality of data sources of a network of the client;
indications of a plurality of data sinks;
indications of a plurality of modules of an application, wherein for a module of the plurality of modules, an indication of the module comprises:
a mapping, wherein the mapping maps at least one of the data sources to at least one of the data sinks; and
one or more criteria that, when satisfied by data received from one or more particular ones of the data sources, cause the module to send data from the at least one data source to the at least one data sink according to the mapping;
based on the indications of the plurality of data sources, data sinks, and modules, build a package, wherein the package is configured to, subsequent to deployment to an edge device of the network of the client, cause the edge device to:
for the module of the plurality of modules:
connect the module to the one or more particular data sources;
connect the module to the at least one data source and to the at least one data sink according to the mapping for the module;
cause the module to receive the data from the one or more particular data sources; and
in response to a determination that the one or more criteria are satisfied by the data received from the one or more particular data sources, cause the module to send the data from the at least one data source to the at least one data sink according to the mapping; and deploy the package to the edge device.

2. The system as recited in claim 1, wherein the package is further configured to, subsequent to the deployment to the edge device of the network of the client:
implement a scheduler, wherein the scheduler is configured to synchronize delivery of data from the plurality of data sources to the plurality of modules such that different portions of data received from different data sources by a given module at a particular time were generated by the different data sources at the same time.

3. The system as recited in claim 1, wherein the mapping maps derived data to another of the data sinks, wherein the derived data comprises data generated by the module based on processing the data received from the one or more particular data sources or another of the data sources.

4. The system as recited in claim 1, wherein to connect the module to the at least one data source according to the mapping for the module, the package is configured to:
connect the module to a plurality of data source modules, wherein a given data source module is configured to receive source data from a given one of the data sources indicated by the client and to send the source data to the module.

5. The system as recited in claim 1, wherein to connect the module to the at least one data sink according to the mapping for the module, the package is configured to:
connect the module to a plurality of data sink modules, wherein a given data sink module is configured to receive sink data from the module and to send the sink data to a given one of the data sinks indicated by the client.

6. A method, comprising:
performing, by one or more computing devices of a provider network that implement an edge data pipeline service:
receiving, from a client via a management interface:
indications of a plurality of data sources of a network of the client;
an indication of one or more data sinks;
an indication of a module of an application, the indication of the module comprising:
a mapping, wherein the mapping maps at least one of the data sources to at least one of the data sinks; and
one or more criteria that, when satisfied by data received from one or more particular ones of the data sources, cause the module to send data from the at least one data source to the at least one data sink according to the mapping;
based on the indications of the plurality of data sources, the one or more data sinks, and the module, building a package configured to, subsequent to deployment to an edge device of the network of the client:
cause the module to receive the data from the one or more particular data sources; and
in response to a determination that the one or more criteria are satisfied by the data received from the one or more particular data sources, cause the module to send the data from the at least one data source to the at least one data sink according to the mapping; and
deploying the package to the edge device.

7. The method as recited in claim 6, wherein the package is further configured to, subsequent to the deployment to the edge device of the network of the client:
implement a scheduler, wherein the scheduler is configured to synchronize delivery of data from the plurality of data sources to the module such that different portions of data received from different data sources by the module at a particular time were generated by the different data sources at the same time.

8. The method as recited in claim 6, wherein the mapping maps derived data to another of the data sinks, wherein the derived data comprises data generated by the module based on processing the data received from the one or more particular data sources or another of the data sources.

9. The method as recited in claim 8, wherein the derived data comprises a command that is configured to cause a device of the network of the client to perform an action.

10. The method as recited in claim 6, wherein the at least one data sink comprises a remote destination at the provider network.

11. The method as recited in claim 6, wherein the mapping maps one of the data sources other than the one or more particular data sources to a particular one of the sinks.

12. The method as recited in claim 11, wherein the mapping also maps the one or more particular data sources to another one of the sinks.

13. The method as recited in claim 6, wherein satisfaction of the one or more criteria indicates:
an anomaly has been detected within the data received from the one or more particular data sources, or
a level of brightness has been detected within the data received from the one or more particular data sources.

14. The method as recited in claim 13, wherein satisfaction of the one or more criteria indicates:
motion has been detected within the data received from the one or more particular data sources, wherein the data comprises video data from a camera,
a quick response (QR) code or other type of tag has been detected within the data received from the one or more particular data sources, or
the data has been received from the one or more particular data sources.

15. An edge device of a network of a client, comprising:
one or more processors and one or more memories, wherein the one or more memories have stored thereon instructions, which when executed by the one or more processors, cause the one or more processors to:
receive, from a provider network, a package, wherein the package is built based on input provided by the client to the provider network, the input comprising:
indications of a plurality of data sources of the network of the client;
an indication of one or more data sinks;
an indication of a mapping for a module of an application, wherein the mapping maps at least one of the data sources to at least one of the data sinks; and
one or more criteria that, when satisfied by data received from one or more particular ones of the data sources, cause the module to send data from the at least one data source to the at least one data sink according to the mapping; and
based on the package, implement the application to:
cause the module to receive the data from the one or more particular data sources; and
in response to a determination that the one or more criteria are satisfied by the data received from the one or more particular data sources, cause the module to send the data from the at least one data source to the at least one data sink according to the mapping.

16. The edge device as recited in claim 15, wherein the instructions, when executed by the one or more processors, further cause the one or more processors to implement the application to:
implement a scheduler, wherein the scheduler is configured to synchronize delivery of data from the plurality of data sources to the module such that different portions of data received from different data sources by the module at a particular time were generated by the different data sources at the same time.

17. The edge device as recited in claim 15, wherein the mapping maps derived data to another of the data sinks, wherein the derived data comprises data generated by the module based on processing the data received from the one or more particular data sources or another of the data sources.

18. The edge device as recited in claim 15, wherein the at least one data sink comprises a remote destination at the provider network.

19. The edge device as recited in claim 18, wherein the instructions, when executed by the one or more processors, further cause the one or more processors to implement the application to:
in response to a determination that the module is unable to send a portion of data from the at least one data source to the remote destination, send the portion of data from the at least one data source to a local data store at the network of the client.

20. The edge device as recited in claim 15, wherein the instructions, when executed by the one or more processors, further cause the one or more processors to:
receive, from the network of the client, an indication of an updated mapping for the module, wherein the updated mapping changes the mapping of one of the data sources to a different one of the sinks; and
apply the updated mapping to the module.

\* \* \* \* \*